W. F. LAWLER.
FODDER LOADING APPARATUS.
APPLICATION FILED APR. 19, 1913.

1,103,326.

Patented July 14, 1914.
4 SHEETS—SHEET 1.

WITNESSES
INVENTOR
William F. Lawler
his Attorney

W. F. LAWLER.
FODDER LOADING APPARATUS.
APPLICATION FILED APR. 19, 1913.

1,103,326.

Patented July 14, 1914.
4 SHEETS—SHEET 2.

W. F. LAWLER.
FODDER LOADING APPARATUS.
APPLICATION FILED APR. 19, 1913.

1,103,326.

Patented July 14, 1914.

4 SHEETS—SHEET 4.

UNITED STATES PATENT OFFICE.

WILLIAM F. LAWLER, OF ANDERSON, INDIANA.

FODDER-LOADING APPARATUS.

1,103,326.  Specification of Letters Patent.  Patented July 14, 1914.

Application filed April 19, 1913. Serial No. 762,366.

*To all whom it may concern:*

Be it known that I, WILLIAM F. LAWLER, a citizen of the United States, residing at Anderson, in the county of Madison and State of Indiana, have invented certain new and useful Improvements in Fodder-Loading Apparatus, of which the following is a specification.

My present invention relates to fodder loading apparatus in which a normally inclined oscillatable slide-way is provided, so mounted that it may be disposed with a fixed horizontal axis of oscillation relative to the place of deposition of the fodder, and capable of moving from a normal position due to the weight of the fodder after the latter has been moved upwardly on the slide-way to a predetermined extent so that the fodder may easily be placed or stacked as on a wagon.

The principal object of my invention is to provide apparatus whereby fodder may be quickly loaded upon a vehicle, or quickly deposited as for storage, by providing elements and mechanisms which coact in a manner to make a large part of the operation automatic, especially in so far as the carriage of the fodder from the ground to approximately its place of deposition is concerned.

A further object of my invention is to provide apparatus of the character described embodying elements and mechanisms which coact so as to enable the apparatus to be quickly adapted to the particular work at hand, such as for the loading of a vehicle drawn to the field where the fodder matured, or to transfer the fodder from the ground to an elevation considerably higher than the body of a wagon is disposed, such as an upper floor of a barn.

A further object of the invention is to provide means whereby the apparatus may be easily drawn about a wagon so that fodder may be loaded thereon from practically any side of the wagon. This enables the draft animals of the wagon to be unhitched therefrom and used in connection with the apparatus during the loading procedure, and it is not necessary to move the wagon until it is ready to convey the fodder from the field.

Other objects of the invention will appear in the following detailed description, taken in connection with the accompanying drawings, forming a part of this specification, and in which drawings:—

Figure 1:
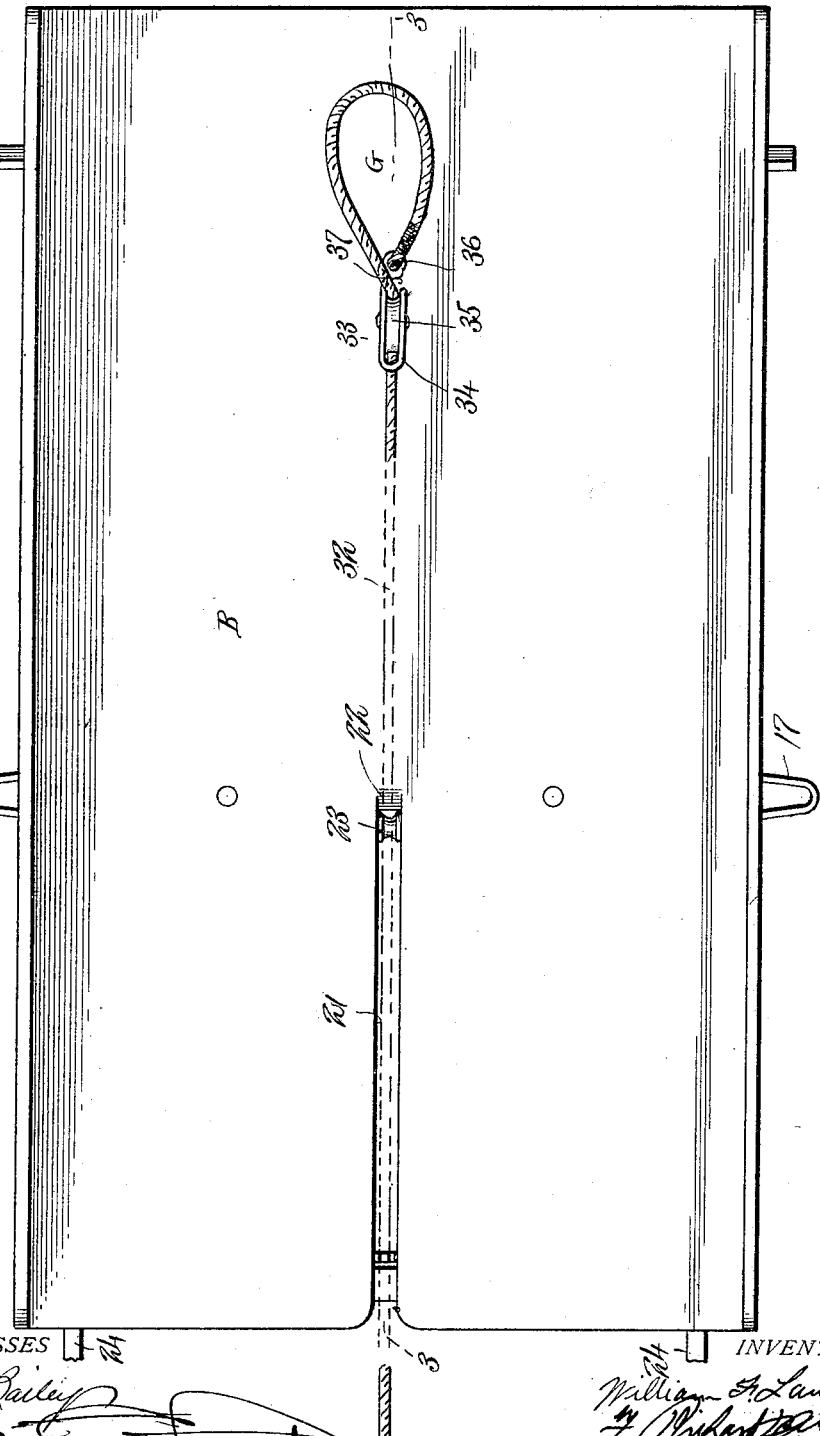
Figure 2:
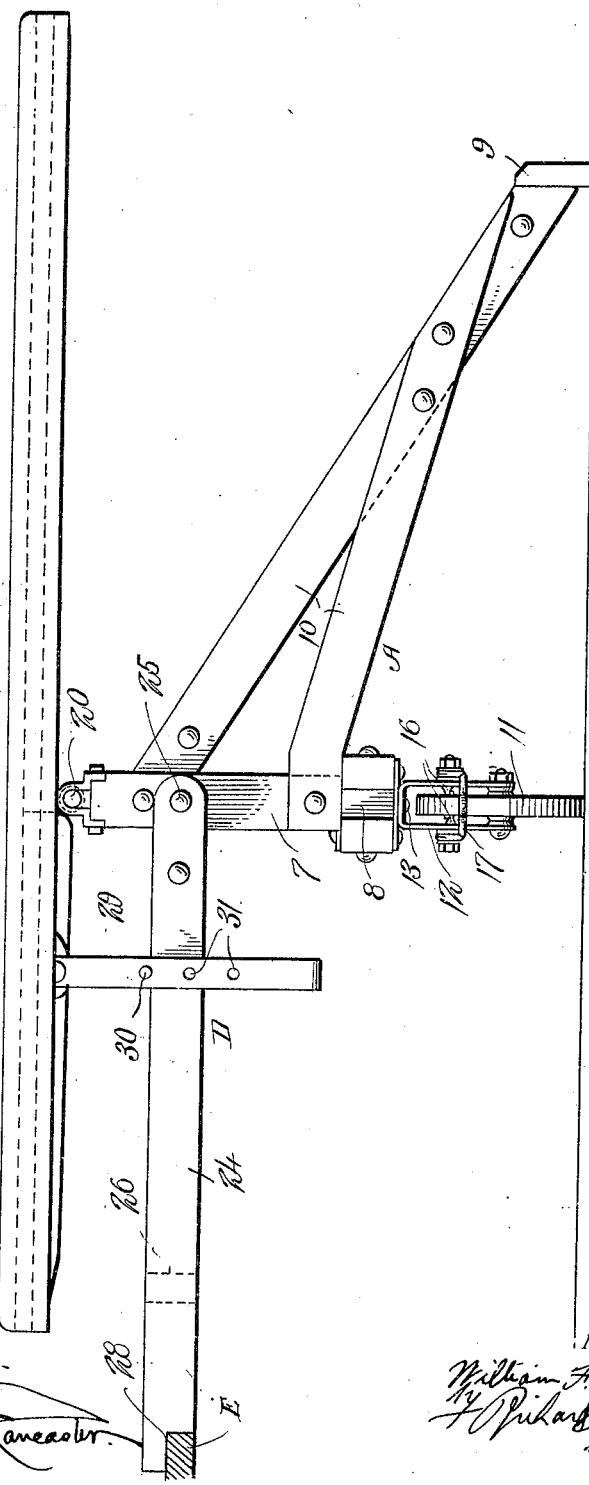
Figure 3:
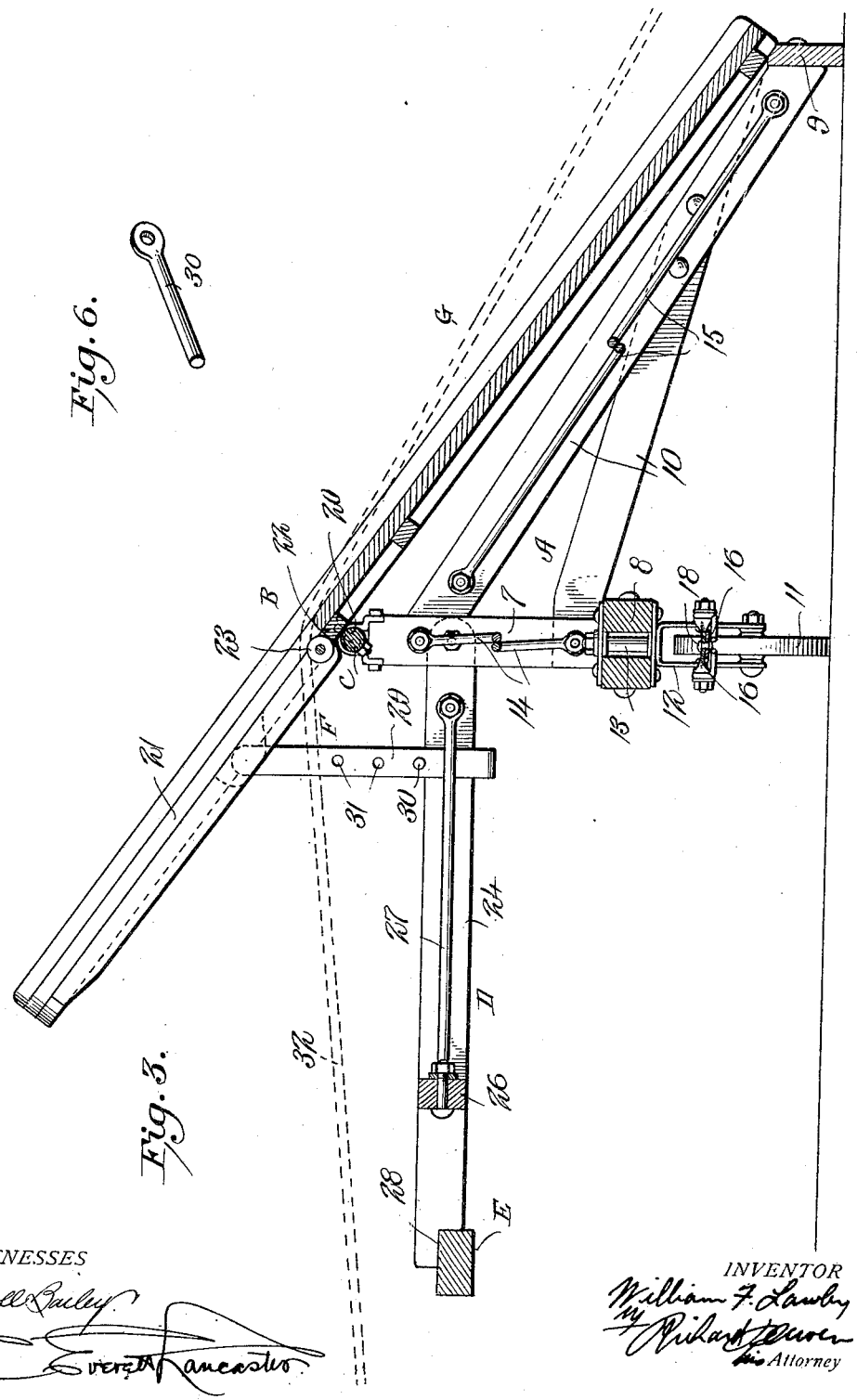
Figure 4:
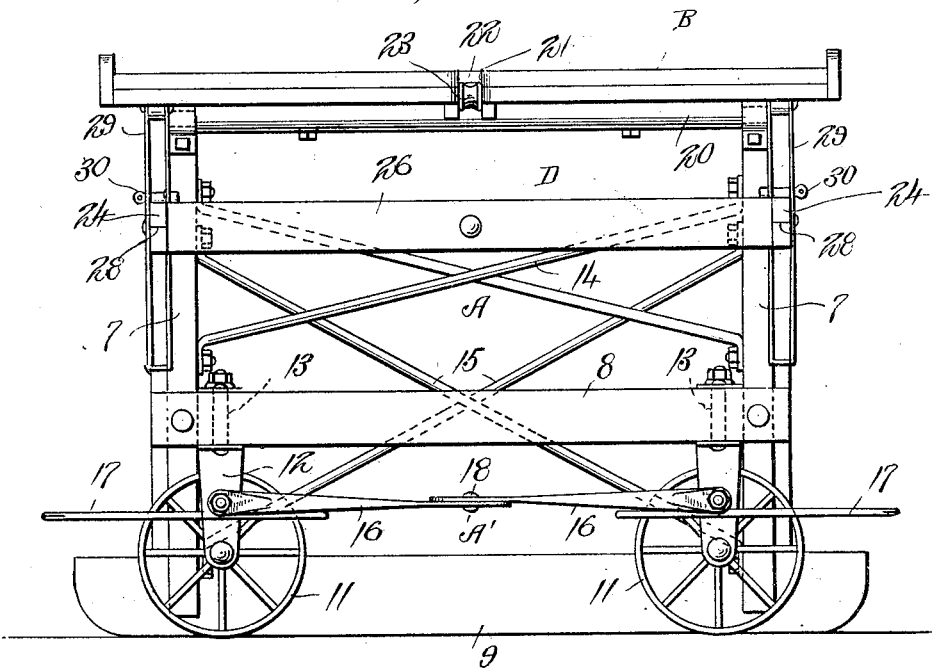
Figure 5:
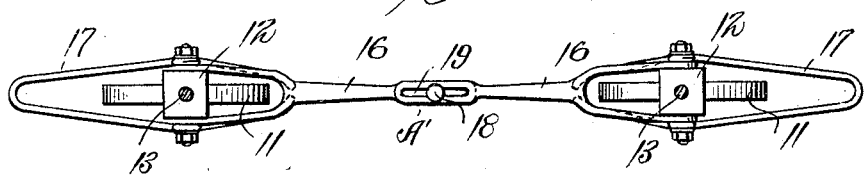

Figure 1 is a plan view of the apparatus embodying my invention. Fig. 2 is a side elevation of the apparatus showing the slide-way actuated from a normal position. Fig. 3 is a sectional view on the line 3—3 of Fig. 1. Fig. 4 is an end elevation of the apparatus as disclosed in Fig. 2 looking in the direction of the arrow. Fig. 5 is a plan view of wheels and mechanism forming a part of the chassis of the apparatus. Fig. 6 is a perspective view of a retaining means forming a part of mechanism for limiting the amplitude of oscillation of the slide-way.

In the drawings, where similar characters refer to similar parts, A designates the chassis of the apparatus carrying a slide-way B oscillatable about a horizontal axis, as indicated at C. The chassis A carries a spacing frame D adapted for engagement with a stationary object, such as the frame member E of a wagon, and is provided to retain the chassis rigid with such object, when such is desired. The apparatus also includes means F for limiting the amplitude of oscillation of the slide-way B or to rigidly position the same relative to the spacing frame D. Suitable tackle G is also provided for the purpose of drawing the fodder over the field and on the slide-way B.

The chassis A is provided in order that the apparatus may be drawn to and about the field and is built up to include upright members 7 surmounted upon a beam 8; a runner 9 spaced apart from beam 8 as by inclined braces 10; and, wheels 11 supporting beam 8. The wheels 11 have a vertical axis of oscillation, as through their supports 12, in the form of forks, supported by bolts 13. Suitable brace rods 14 may be provided to add stability to the upright members 7, and likewise, the braces 10 may be stabilized by brace rods 15.

The amplitude of oscillation of wheels 11 about the vertical axes hereinbefore mentioned is limited by mechanism A', more specifically shown in Figs. 4 and 5 of the drawings. This mechanism is provided in order that the wheels 11 will be, at all times, disposed with their planes converging or coinciding, and it also provides means whereby draft animals may be attached to the apparatus for the purpose of transporting the same. The mechanism A' may comprise arms 16, one for each fork 12 extending inwardly toward the longitudinal axis of the apparatus; draw-bars 17 extending outwardly from each fork 12; and, a pin 18, or the like, extending through elongated slots 19 provided adjacent the end of each arm 16. The draft animals may be connected to either draw-bar 17 and it is to be noted that if their movement is such as to oscillate one wheel about its vertical axis, then the other wheel will be actuated through arms 16 so that their planes either intersect or coincide. This is desirable since, when drawing the apparatus about a wagon, it follows a curved path.

Concerning slide-way B, it is suitably connected to chassis A as through shaft 20 having its bearing upon the upright members 7. As clearly shown in Fig. 3 of the drawings, this slide-way is pivoted intermediate its ends and the portion to one side of the axis C is heavier than that portion at the other side, so that the slide-way normally assumes an inclined position due to the force of gravity, and when in a normal position, its lower end rests upon the runner 9. A longitudinally extending slot 21 is provided, open at the uppermost end of the slide-way and extending downwardly toward the axis C. This slot provides a way for a flexible member of the tackle G to be subsequently described. I find it desirable to round the lower wall of slot 21 as indicated at 22 and provide a sheave 23 adjacent such wall. It is upon this slide-way that the fodder, formed in suitable bundles or bales, is drawn.

As to the spacing frame D, it comprises longitudinally extending arms 24 pivoted to chassis A as at 25; cross member 26; and, tie rods 27. The members 24 are recessed as at 28 to engage with the frame member E of a stationary object, such as a wagon. It is to be noted that, by reference to Figs. 2 and 3 of the drawings, this spacing frame holds the chassis A in rigid spaced relation to the stationary object and acts as a strut when the fodder is being drawn on the inclined slide-way B.

The means F comprises arms 29, preferably U-shaped, depending from slide-way B and extending in close proximity to members 24; and, pins 30 adapted to be passed through any of a plurality of apertures 31 in arms 29. As before stated, this means is provided to limit the amplitude of oscillation of the slide-way, or, when the pins 30 are passed through the lowermost apertures 31, and contact with members 24 at their upper sides, then the slide-way is rigidly retained with respect to the chassis A. A plurality of apertures 31 are provided in the arms 29, in order that the pins 30 may be passed through the particular apertures 31 so that they will contact with the members 24 when the upper end of the slide-way has been moved from a normal position and is in close proximity to the place of deposition of the fodder.

Concerning the tackle G, it comprises a flexible member 32, and a pulley 33 including a block 34 revolubly carrying a sheave 35. The flexible member 32 is secured to pulley 33 as at 36 and the block has a way 37 intermediate the point 36 and the axis of sheave whereby the flexible member 32 may be slipped into the groove of said sheave. In practice, the flexible member 32 is looped about the bundle of fodder and by disposing a portion of it in the groove of sheave 35, may be drawn tightly about the bundle to form a girth. The fodder is then drawn upon the slide-way B as by connecting draft animals to member 32 tensioning the flexible member. It is to be noted that the groove of sheave 23 receives flexible member 32 as the fodder is drawn toward the apparatus.

In operation, the apparatus is drawn in close proximity to the place of deposition of the fodder and spacing frame D is adjusted to form a strut intermediate some stationary object and the chassis A. Means F is adjusted so that the amplitude of oscillation of the slide-way is such that the upper end of the latter, when thrown from a normal position, will be in operative relation to the stationary object so that the fodder will be guided to approximately its place of deposition. It is to be noted that, as the fodder is drawn upon the inclined slide-way, the frame D prevents movement of the apparatus toward the stationary object and after the bundle of fodder passes over the axis C the slide-way is moved from a normal position, unless means F is so arranged to prevent such movement. Assuming that the slide-way is free to oscillate, the upper end moves downwardly and the bundle of fodder is easily drawn from the apparatus. As soon as the fodder is drawn off the slide way, the latter assumes a normal position due to the force of gravity. If it is desired to transfer the fodder from the field to an upper floor of a barn, then the pins 30 can be so disposed in the lowermost apertures 31 in arms 29 that the slide-way is immovable and therefore a slide-way is provided in operative relation to such floor of the barn.

It is to be noted that the draft animals may be unhitched from a wagon and used to draw the fodder upon the slideway and that the wagon need not be moved until it is ready to convey the fodder from the field since the apparatus can be readily moved from one side of the wagon to the other.

Changes in details may be made without departing from the spirit or scope of my invention; but,

I claim:—

1. A fodder loading apparatus comprising in combination, a chassis, a slide-way carried thereby and having a horizontal axis of oscillation, and a spacing frame for rigidly positioning said chassis relative to a stationary object, said frame being movable with respect to said chassis to permit of adjustment to the height of the abutting element of the said stationary object from the ground.

2. A fodder loading apparatus comprising in combination, a chassis including a pair of wheels, a slide-way carried thereby and having a horizontal axis of oscillation in substantially the same common plane of said wheels, said slide-way being normally inclined, and a spacing frame movable about a horizontal axis in substantially the same common plane of said wheels, for rigidly positioning said chassis relative to a stationary object with the upper end of said slide-way closest to the said object.

3. A fodder loading apparatus comprising in combination, a chassis, a slide-way carried by said chassis with a horizontal axis of oscillation intermediate its ends, the slide-way at one side of the said axis being heavier than that at the other side thereof to normally dispose the slide-way in an inclined position, by gravity, and a spacing frame extending from said chassis and to the same side of the said axis as the lighter portion of said slide-way for rigidly positioning said chassis relative to a stationary object and limiting the amplitude of oscillation of said slide-way in one direction.

4. In a fodder loading apparatus, the combination of a support frame, a slide-way carried thereby and oscillatable about a horizontal axis, said slide-way being normally inclined and having a longitudinally extending slot open at its upper edge and extending downwardly toward said axis, and tackle including a flexible member adapted to extend through the said slot, substantially as and for the purpose set forth.

5. In a fodder loading apparatus, the combination of a support frame, a slide-way carried thereby and oscillatable about a horizontal axis, said slide-way being heavier at one side of the said axis than at the other side thereof to normally dispose the slide-way in an inclined position, by gravity, and having a longitudinally extending slot open at its upper edge and extending downwardly toward the said axis, and tackle including a flexible member adapted to extend through the said slot, substantially as and for the purpose set forth.

6. In a fodder loading apparatus, the combination of a support frame, a slide-way carried thereby and oscillatable about a horizontal axis, said slide-way being normally inclined and having a longitudinally extending slot open at its upper edge and extending downwardly toward the said axis, tackle including a flexible member adapted to extend through the said slot, and means for rigidly positioning said slide-way relative to said support frame, in an inclined position, substantially as and for the purpose set forth.

7. A fodder loading apparatus comprising in combination, a chassis, a spacing frame carried thereby, a normally inclined slide-way oscillatably carried by said chassis, arms depending from said slide-way to extend into close proximity to said spacing frame, said arms having a plurality of apertures, and pins to fit into any of the said apertures of said arms to engage with said spacing arm, substantially as and for the purpose set forth.

8. A fodder loading apparatus comprising in combination, a chassis, a spacing frame carried thereby, a normally inclined slide-way oscillatably carried by said chassis, and means for limiting the amplitude of oscillation of said slide-way, substantially as and for the purpose set forth.

9. A fodder loading apparatus comprising in combination, a chassis, a spacing frame carried thereby, a normally inclined slide-way oscillatably carried by said chassis, and adjustable means for limiting the amplitude of oscillation of said slide-way, substantially as and for the purpose set forth.

10. In a fodder loading apparatus, the combination of a support frame including upright members and a beam, a runner spaced apart from said beam, a slide-way oscillatably mounted upon said upright members and normally inclined with its lowermost end adjacent said runner, wheels oscillatable about a vertical axis upon which said beam is mounted, and means for limiting the amplitude of oscillation of said wheels about the said vertical axes so that the planes of the wheels intersect or coincide, substantially as and for the purpose set forth.

11. A tackle for fodder comprising in combination, a flexible member, and a pulley including a block to which said flexible member is attached and a sheave carried by said block, the latter having a way in its side intermediate the point of connection with said flexible member and the axis of said sheave, substantially as and for the purpose set forth.

In testimony whereof I affix my signature in presence of two witnesses.

WILLIAM F. LAWLER.

Witnesses:
FRANK P. FOSTER,
GEO. A. LAUPHEAR.

Copies of this patent may be obtained for five cents each, by addressing the "Commissioner of Patents, Washington, D. C."